United States Patent [19] [11] Patent Number: 5,987,815
Payr [45] Date of Patent: Nov. 23, 1999

[54] FIXING DEVICE FOR A PLANT STAKE

[75] Inventor: Hubert Payr, Ebreichsdorf, Austria

[73] Assignee: Tomco Handelsges m.b.H., Ebreichsdorf, Austria

[21] Appl. No.: 08/765,207
[22] PCT Filed: Jul. 4, 1995
[86] PCT No.: PCT/AT95/00142
 § 371 Date: Jan. 3, 1997
 § 102(e) Date: Jan. 3, 1997
[87] PCT Pub. No.: WO96/01039
 PCT Pub. Date: Jan. 18, 1996

[30] Foreign Application Priority Data

Jul. 5, 1994 [AT] Austria ................. 1324/94

[51] Int. Cl.$^6$ ............................................. A01G 9/12
[52] U.S. Cl. ............................................. 47/70
[58] Field of Search ........................... 47/70, 65.5

[56] References Cited

U.S. PATENT DOCUMENTS 4,074,461  2/1978  Hirschman ................ 47/70
5,263,279  11/1993 Delsanne et al. ............ 47/70

FOREIGN PATENT DOCUMENTS

| 0058738 | 9/1982 | European Pat. Off. . |
| 2519513 | 7/1983 | France ................ 47/70 |
| 2541076 | 8/1984 | France . |
| 2585212 | 1/1987 | France ................ 47/70 |
| 2678476 | 1/1993 | France . |
| 2323763 | 11/1974 | Germany . |
| 408516 | 9/1966 | Switzerland . |
| 636748 | 6/1983 | Switzerland . |
| 2274571 | 8/1994 | United Kingdom ..... 47/70 |

Primary Examiner—Michael J. Carone
Assistant Examiner—Joanne C. Downs
Attorney, Agent, or Firm—Ostrolenk, Faber, Gerb & Soffen, LLP

[57] ABSTRACT

A fixing device for a plant supporting rod has a holder (6, 13, 20) that holds the plant supporting rod (3) inserted into the planting substrate (4) at the edge (8) of the plant container (1). In order to safely hold the plant supporting rod in all directions, the plant supporting rod (3) is supported against the edge (8) of the plant pot (1) approximately at the level of the edge (8) of the plant container (1) and in two directions that form an angle ($\alpha$) with each other.

24 Claims, 2 Drawing Sheets

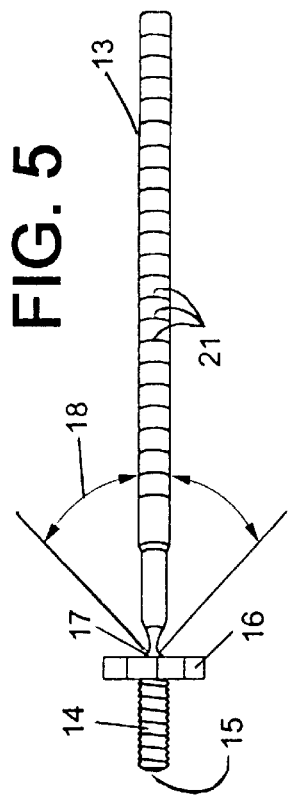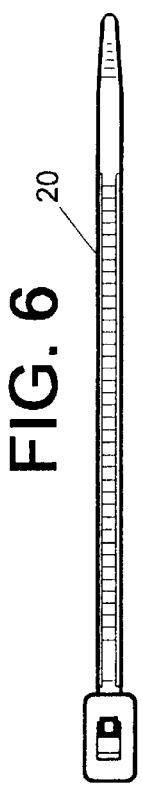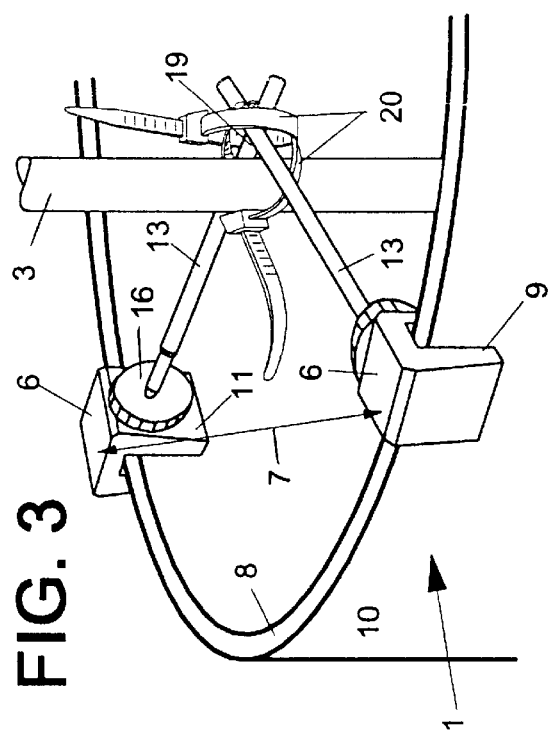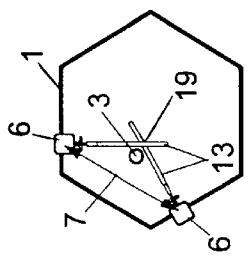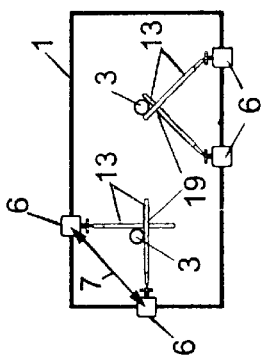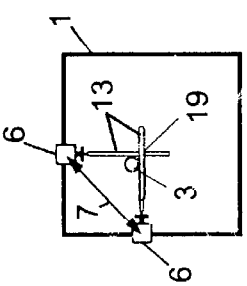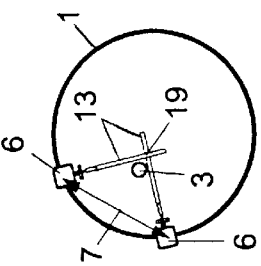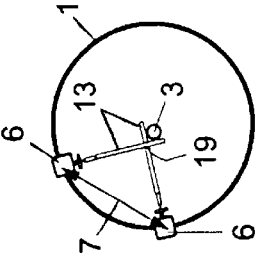

FIXING DEVICE FOR A PLANT STAKE

BACKGROUND OF THE INVENTION

The present invention relates to a fixing device for a plant stake, comprising a holding device for holding a plant stake extending into the planting material to the rim of a plant container, wherein the plant stake in the region of the rim of the plant container is supported against the rim of the plant container in two directions forming an angle with one another, two retaining bars are provided which are affixable in the region of the rim of the plant container in order to support the plant stake, and the plant stake can be fixed to the retaining bars by a fixing device.

Plant stakes for supporting potted plants are usually put into the planting material, such as into potting soil or, with hydroponics, into a hydro material. The plant stakes may loosen with time and will then no longer offer reliable support for the plant. This is increasingly the case if the plant grows in a particular direction. Loosening of the rod may, however, also ensue when transporting the pot plant and above all outdoors, if the pot plant is exposed to the weather.

To overcome this problem, there have been attempts to attach the plant stakes via cords or wires by means of nails driven into a nearby wall. One of the problems associated with this method is that it will no longer be possible to move or turn the pot plant.

To fix the plant stake with respect to the plant container, it is known (from CH-A-636.748) to fasten a screw clamp to the rim of the plant container, from which former a rail departs that is directed toward the center of the plant container, the rail being urged against the rim of the plant container by means of the screw clamp. To this rail, the plant stake can be attached by a further screw clamp.

Yet, this known device has the disadvantage that the plant stake is still able to tilt to the side, as forces acting on the plant stake from the plant may only run in the direction of the rail, to enable them to be passed on into the plant container.

A fixing device for a plant stake by which the forces acting on the plant stake from all directions can be conducted into the plant container is known from CH-A-408.516. In accordance with this document, a carrying device is provided which can be clamped to the rim of the plant container and is equipped with a bracket of tubular construction projecting toward the center of the plant container. A lifting lug an be inserted into this bracket and fixed, with the lifting lug being displaceable against the bracket in the radial direction of the plant container. At its inner end, i.e. at its one end that is directed toward the center of the plant container, this lifting lug carries a jacket which is closed at its lower end and into which the plant stake can be inserted. Here, the plant stake does not come into contact with the soil of the pot plant, but via the plant stake very great forces are conducted into the bracket which is clampable to the rim of the plant container via the lifting lug, so that the bracket has to be of correspondingly rigid and stout design. This known fixing device for a plant stake is not only very complicated in construction and hence correspondingly expensive to produce, but by its bulky and stout construction will affect the appearance of the pot plant. Moreover, all of the forces are passed onward to the rim of the plant container exclusively, so that the latter has to resist a very considerable load.

A fixing device for a plant stake of the initially described kind is already known from FR-A-2 541 076. Here, two clamps are provided which can be put into position on the rim of the pot and each of which has an extension that points toward the center of the pot and serves as a guide rail for one pole each, the latter being displaceable along this guide rail in accordance with the diameter of the pot. The two poles are rigidly fastened to a cane supporting a plant stake. Thus, two poles arranged at an invariable angle to each other depart from the cane supporting the plant stake, such that the distance at which the clamps have to be fastened to the rim of the pot is rigidly prefixed.

From EP-A-0 058 738, a fixing device for a plant stake is known, consisting of a single clamp which can be affixed to the rim of the pot and from which a retaining bar projects toward the center of the pot. At its end, the retaining bar carries a pipe extension that is closed at the bottom and into which the plant stake can be inserted. Between the clamp and the retaining bar a weak spot is provided, such that in a vertically oriented plane the retaining bar can be swung horizontally about this weak spot which acts as a horizontally oriented articulated point.

SUMMARY OF THE INVENTION

The invention aims at avoiding the foregoing disadvantages and difficulties and has as its object to further develop a fixing device for a plant stake of the initially described kind in that the plant stake is fixed reliably and safely with respect tot he plant container, wherein the plant stake will not loosen even after some time. In particular, the fixing device for a plant stake is to be made up of only a few parts, is to be easily and cost-advantageously produceable and, in addition, is to affect the outward appearance of the plant container after fitting only very slightly, i.e. the fixing device for a plant stake is to be optically much less prominent than the plant, hence is to be visible only with difficulty. The forces exerted on the plant container via the plant stake are to act on the plant container as evenly as possible. In particular, simple adjustment of the device to plant containers of different designs, such as different inclinations of plant container sidewalls, different diameters and different cross-sectional profiles of the plant containers, is to be feasible.

In accordance with the invention, this object is achieved in that each of the two retaining bars is provided with an articulated point enabling the portion of the retaining bar projecting inside the plant container to be movable relative to the rim of the plant container in all directions.

The device according to the invention is particularly widely applicable if the articulated point allows movability about an angle of roughly up to 45° in all directions.

In accordance with a suitable embodiment, clamps are provided which can be affixed to the rim of a plant container, each of them being affixable to the rim of the plant container by means of a screw thread.

A cost-efficient embodiment is characterized in that each retaining bar can be screwed in by a screw thread provided at one of its ends, fixing the clamp to the rim of the plant container, wherein advantageously the articulated point is provided in the vicinity of the screw thread.

Herein, each retaining bar can suitably be screwed into the clamp by the back end of the screw thread, fixing the clamp to the rim of the plant container.

A preferred embodiment is characterized in that each clamp is of U-shaped design and by one leg rests against the exterior of the plant container and by its second leg projects inside the plant container, the second leg being provided with a threaded hole into which the retaining bar can be screwed by a screw thread provided at one of its ends, fixing the clamp to the rim of the plant container by the back end of the screw thread. With this embodiment, the retaining bar serves not only for holding the plant stake but also for fixing the device to the rim of the plant container, allowing a particularly simple construction comprising only a small number of parts.

To be able to fasten the device to plant containers of only slight wall thickness as well, the length of the screw thread provided on the retaining bar is dimensioned such that with the retaining bar being screwed into the leg of the clamp to a maximum extent, the back end of the screw thread will occupy a position in the region of the second leg of the clamp.

For simple handling of the device, the retaining bar is provided with a knurled disk preferably arranged in the region of the front end of the screw thread.

Preferably, the articulated point preferably provided adjacent to the knurled disk is constructed as a weak spot enabling bending of the retaining bar.

A particularly cost-effective embodiment of the invention is characterized in that the fixing device is formed by a cable fastening loop. Cable fastening loops constitute an easily produceable and, due to mass production, very cheap component of great strength.

Preferably, the leg of the clamp that projects inside the plant container is provided with at least two threaded holes arranged at superposed height levels, whereby it becomes feasible to provide the retaining bars at different height levels, which can be advantageous with bulgelike rims of plant containers.

To ensure a long service life despite simple production of the device, the clamp is suitably made from synthetic material, such as glass-fiber reinforced synthetic material, preferably polyester resin, wherein advantageously the retaining bar and also the cable fastening loop are made from a UV resistant polyamide.

For achieving a particularly satisfactory degree of fixation, advantageously the retaining bar is provided with surface roughness, such as grooves or ribs, at the region by which it projects inside the plant container.

Further, a particularly high level of stability can be achieved in that two cable fastening loops are provided as a fixing device, wherein one cable fastening loop is wound both around the two retaining bars and the plant stake and the second cable fastening loop is only wound around the retaining bars, in the intersection area of the same.

For easy handling, the fixing device for a plant stake is advantageously a unit packed as a set, consisting of two U-shaped clamps, two retaining bars provided with a screw thread at one end each and at least one cable fastening loop.

BRIEF DESCRIPTION OF THE DRAWINGS

In the following, the invention will be explained in more detail with reference to the drawings, wherein:

FIG. 3 depicts a preferred variant;

FIGS. 4, 5 and 6 illustrate the individual components of a fixing device for a plant stake according to the invention; and FIGS. 7 to 12 show how the same is applied with different plant containers.

DESCRIPTION OF THE INVENTION

Figure 1:
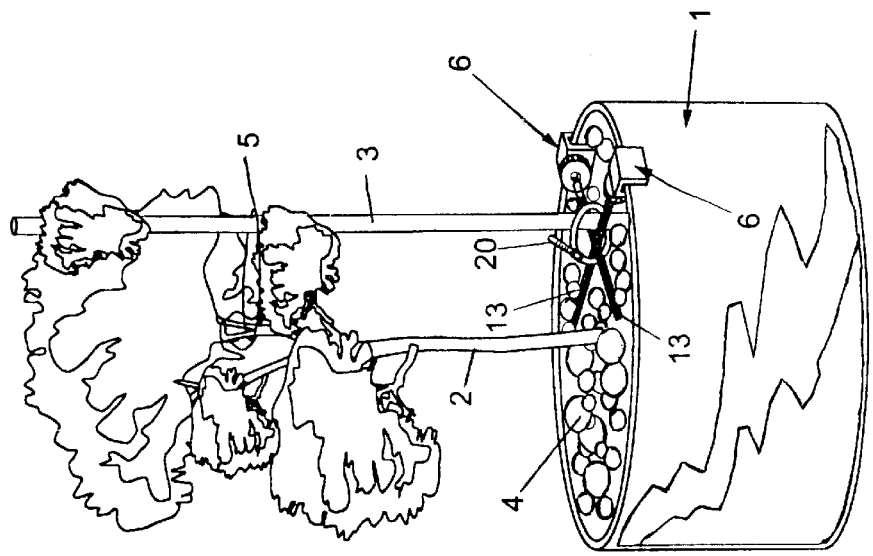
FIG. 1 shows a view of a pot plant with a fixing device for a plant stake in accordance with the invention.

In a plant container 1, a pot plant 2 has been planted that is supported by a plant stake 3, the lower end of which projects into the planting material 4, e.g. the soil, present within the plant container 1. The pot plant 2 has been tied to the plant stake 3, for instance with a cord 5, etc.

The fixing device for a plant stake is provided with two clamps 6 of U-shaped design that are fastenable to the rim 8 of the plant container 1 at a distance 7 from each other, namely such that each clamp 6 by one leg 9 rests against the exterior 10 of the plant container 1 and by its second leg 11 projects inside the plant container 1. The second leg 11 is provided with a threaded hole 12 into which a retaining bar 13 exhibiting a screw thread 14 at one of its ends can be screwed. The back end of the screw thread 15 effects the fixing of the clamp 6 to the rim 8 of the plant container 1.

For screwing the retaining bar 13 into the threaded hole 12 of the clamp 6, there serves a knurled screw 16 placed on the front end of the screw thread, which enables easy handling. In the immediate vicinity of the knurled screw 16, a weak spot 17 is provided on the retaining bar 13, such that the latter is bendable with respect to the part carrying the screw thread 14 in accordance with the arrows shown 18 in FIG. 5.

Figure 2:
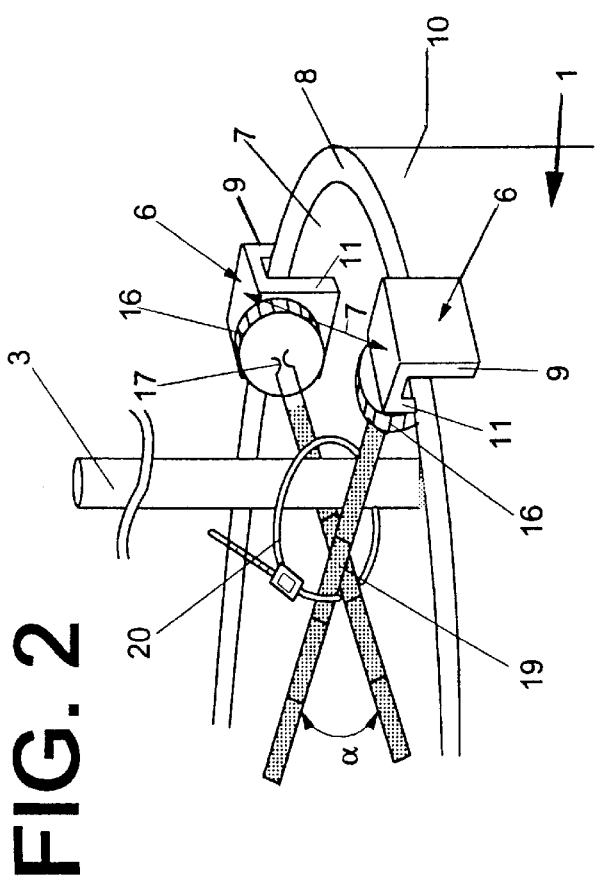
FIG. 2 is a detail of this FIG. 1 on an enlarged scale.

The fixing device for a plant stake is arranged at the rim 8 of the plant container 1 in such a manner that the retaining bars 13 enclose an angle α, which suitably lies in a range of between 60 and 120°, preferably amounting to about 90°. The plant stake 3 will lie in the region of the point of intersection 19 of the two retaining bars 13. After screwing tight the retaining bars 13 in the clamps 6 put into position on the rim 8, a cable fastening loop 20 is wound around the plant stake 3 and around the two retaining bars 13 crossing one another, as can be seen particularly from FIG. 2, and, first of all, the plant stake 3 is immobilized in relation to the retaining bars 13 by slightly tightening said loop. After adjusting the plant stake 3 in its desired final position, the cable fastening loop 20 is pulled tight. Thereby, the plant stake 3 is pressed against the retaining bars 13 so firmly that horizontal movement, i.e. moving the plant stake 3 in the direction of the plane of the rim 8 of the plant container 1, is rendered impossible. Since the plant stake 3 by its lower end projects into the planting material 4, it can no longer be swung horizontally; the soil respectively the hydro material 4 inside the plant container 1 offers firm hold at the bottom of the pot.

The fixing device for a plant stake is manufactured entirely from a synthetic material, with the clamps 6 being preferably produced from a glass-fiber reinforced polyester resin and the retaining bars 13 preferably from nylon. The cable fastening loop 20 is a commercial product of the electrical industry and is likewise made from nylon. The clamps 6 can also be made from metal, preferably from aluminum, which is particularly advantageous with larger dimensions destined to be used with plant containers 1 having thicker rims 8.

The retaining bars 13 can be provided with predetermined breaking points, to enable shortening them to the desired length.

As can be seen particularly from FIG. 4, the clamp 6 is provided with two threaded holes 12 that are subsequently arranged in the longitudinal direction of the second leg 11, and the retaining bar 13 can be alternatively inserted into one of said threaded holes 12. The choice of the threaded hole 12 is determined by the individual design of the rim 8 of the plant contained 1.

The retaining bars 13 advantageously are provided with surface roughnesses 21 to increase the holding forces acting between the retaining bars 13, the cable fastening loop 20 and the plant stake 3.

A particularly high level of stability can be achieved by utilizing two cable fastening loops 20 for fixing the plant stake 3, wherein—as is illustrated in FIG. 3—one cable fastening loop 20 is wound both around the two retaining bars 13 and around the plant stake 3, and the second cable fastening loop 20 is only wound around the retaining bars 13 in the intersection area 19 of the same.

As can be seen from FIGS. 7 through 11, the fixing device for a plant stake is adaptable to all common plant containers 1, easy assembly being ensured with respect to all common types of plant containers due to the movability of the retaining bars 13 relative to the part carrying the screw thread 14.

Figure 12:
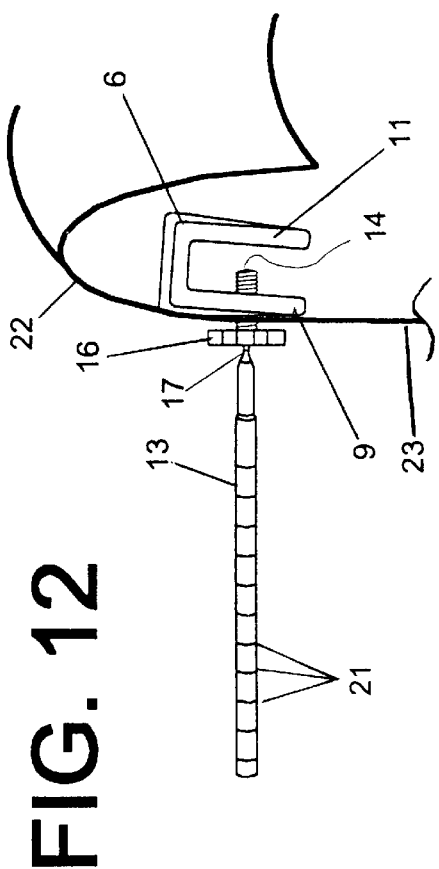

FIG. 12 depicts an arrangement for plant containers 1 provided with a pronounced bulging edge 22. Here, a hole has to be drilled into the wall 23 of the plant container, through which hole the retaining bar 13 is passed by its screw thread 14. The clamp 6 is then screwed on like a nut.

An essential aspect with the fixing device for a plant stake is the three-point fixation of the system on the level of the rim 8 of the plant container 1 in combination with fixing the lower end of the plant stake 3 in the planting material 4.

I claim:

1. A fixing device for fixing a plant stake to a rim of a plant container, the plant stake extending into planting material within the plant container, the fixing device comprising:

a plurality of retaining bars affixable to the plant container in the region of the rim of the plant container without being movable along the rim, each of the retaining bars having a portion projecting inside the plant container, each of the retaining bars also having an articulated point along its length forming a portion of the retaining bar for projecting inside the plant container, and, the articulated point being adapted to enable the portion of the retaining bar projecting inside the plant container to be movable relative to the rim of the plant container in all directions around the articulated point; and a fastening device for fastening the plant stake to the plurality of retaining bars for supporting the plant stake against the rim of the plant container in at least two directions.

2. The fixing device of claim 1, wherein each of the retaining bars has a first end and a second end, and each of the retaining bars is affixable to the rim region of the plant container at only the first end of the retaining bar.

3. The fixing device of claim 1, wherein the articulated point is adapted to enable movement of the portion around the articulated point and at an angle of up to approximately 45° in all directions.

4. The fixing device of claim 1, further comprising a clamp for affixing each of the retaining bars to the rim region of the plant container, and a screw for affixing the clamp to the rim region of the plant container.

5. The fixing device of claim 4, wherein each of the retaining bars has a first end and a second end, and each of the retaining bars also has a screw thread extending from the first end toward the second end for screwing into the respective clamp to thereby affix the respective clamp to the rim region of the plant container.

6. The fixing device of claim 5, wherein the articulated point of each of the retaining bars is in the vicinity of the respective screw thread.

7. The fixing device of claim 5, wherein each retaining bar can be screwed into the respective clamp by the screw thread to thereby affix the respective clamp to the rim region of the plant container.

8. The fixing device of claim 5, wherein each clamp is U-shaped and includes first and second legs, the first leg for resting against the exterior of the plant container and the second leg for projecting inside the plant container, the second leg having a threaded hole into which the screw thread of the respective retaining bar may be screwed to thereby affix the clamp to the rim region of the plant container by clamping the plant container between the first end of the retaining bar and the first leg of the clamp.

9. The fixing device of claim 8, wherein the screw thread on the retaining bar has a length that is dimensioned such that the first end of the retaining bar occupies a position in the region of the first leg of the clamp when the retaining bar is screwed into the second leg of the clamp to a maximum extent.

10. The fixing device of claim 8, wherein the second leg of the clamp includes at least two threaded holes at superposed height levels.

11. The fixing device of claim 5, further comprising a knurled disk on each retaining bar.

12. The fixing device of claim 11, wherein the knurled disk is disposed proximate the screw thread.

13. The fixing device of claim 11, wherein the articulated point is substantially adjacent the knurled disk.

14. The fixing device of claim 4, wherein the clamp is made from synthetic material.

15. The fixing device of claim 14, wherein the clamp is made from glass-fiber reinforced synthetic material.

16. The fixing device of claim 14, wherein the clamp is made from polyester resin.

17. The fixing device of claim 1, wherein the articulated point comprises a weak spot in the retaining bar for enabling bending of the retaining bar at the weak spot.

18. The fixing device of claim 1, wherein the fastening device comprises a cable fastening loop.

19. The fixing device of claim 1, wherein the fastening device comprises first and second cable fastening loops, wherein the first cable fastening loop is wound both around the two retaining bars and the plant stake, and the second cable fastening loop is only wound around the retaining bars, in an intersection area of the plurality of retaining bars.

20. The fixing device of claim 1, wherein the plurality of retaining bars are made from a UV-resistant polyamide.

21. The fixing device of claim 1, wherein the fastening device is made from a UV-resistant polyamide.

22. The fixing device of claim 1, wherein each of the retaining bars is provided with surface roughness at a region by which the retaining bar projects inside the plant container.

23. The fixing device of claim 22, wherein the surface roughness comprises grooves.

24. The fixing device of claim 22, wherein the surface roughness comprises ribs.

* * * * *